UNITED STATES PATENT OFFICE.

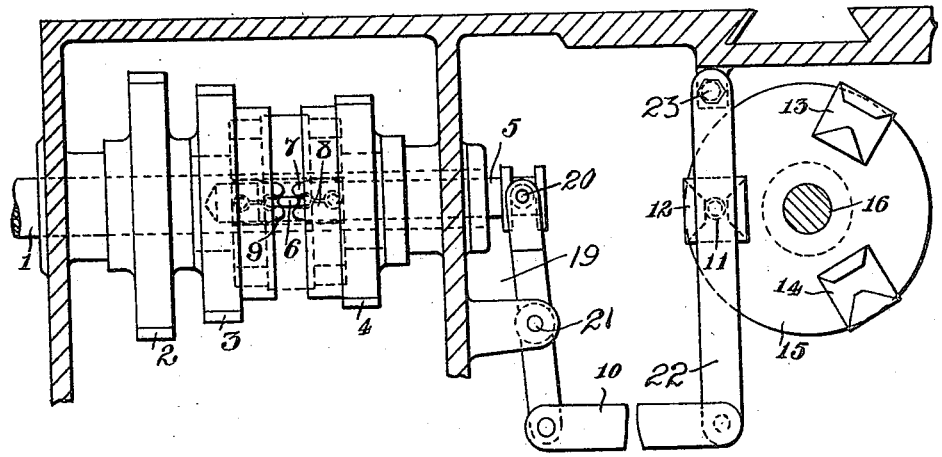

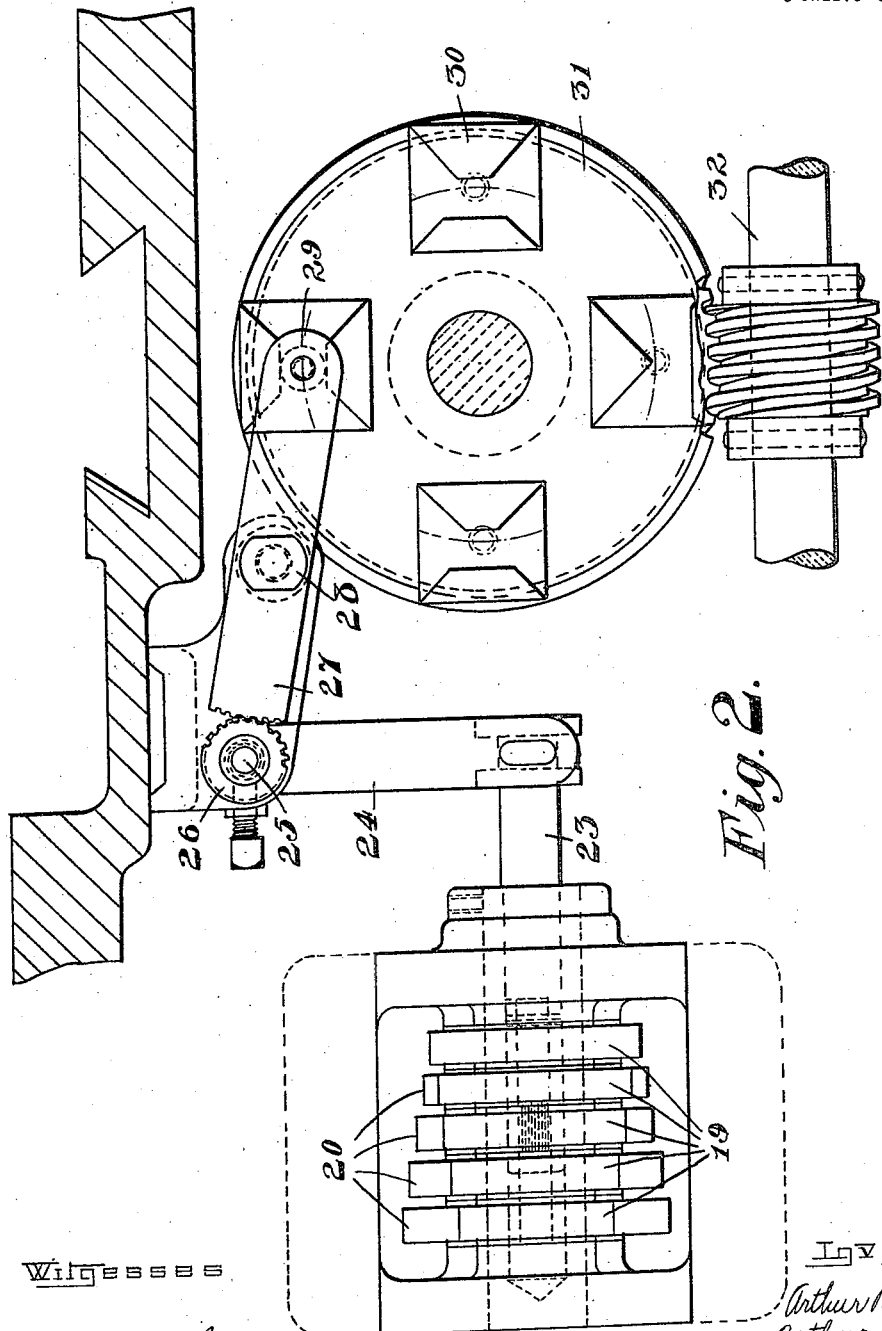

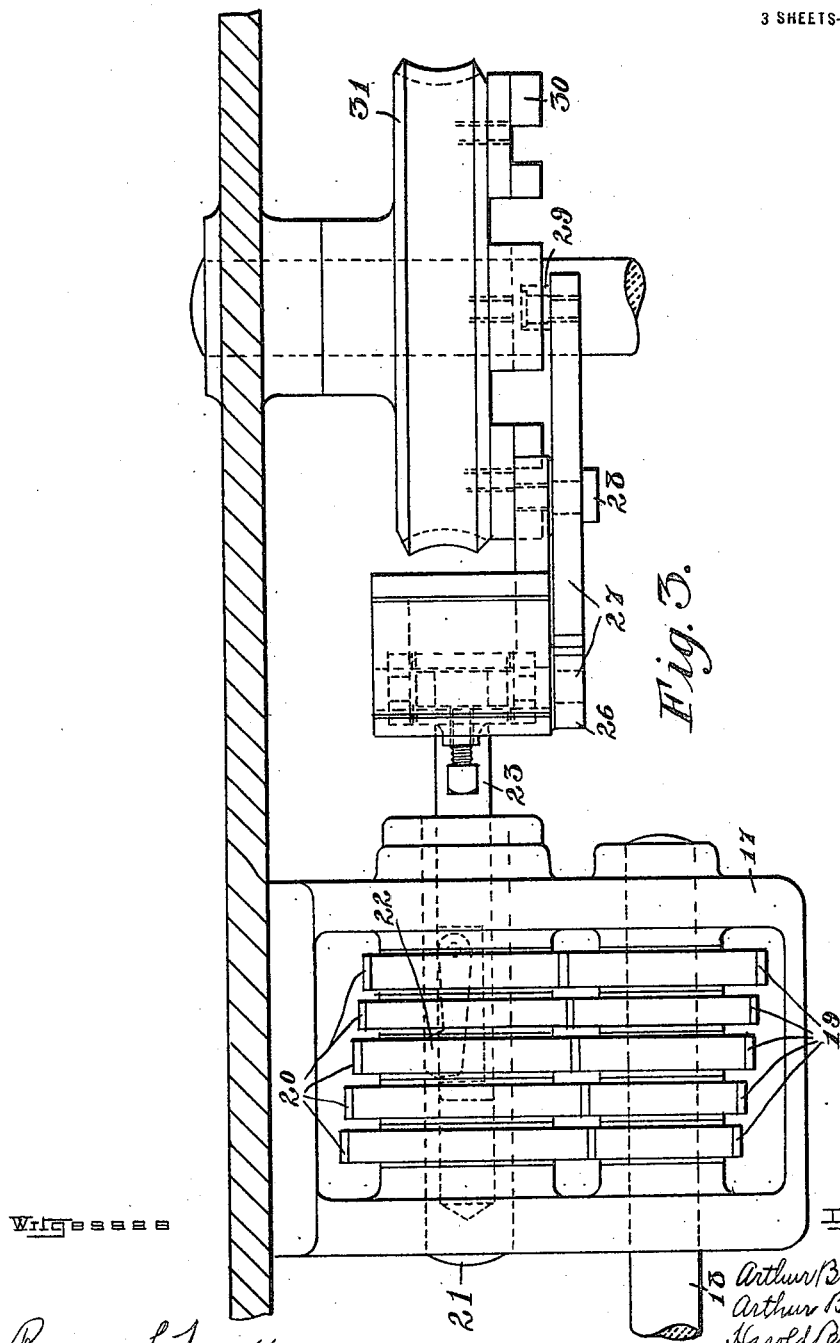

ARTHUR BUTTERWORTH, ARTHUR BUTTERWORTH, JR., AND HAROLD BUTTERWORTH, OF ROCHDALE, ENGLAND.

SEMIAUTOMATIC CHUCKING OR TURNING MACHINE AND THE LIKE MACHINE TOOL.

1,402,397. Specification of Letters Patent. Patented Jan. 3, 1922.

Application filed November 13, 1919. Serial No. 337,841.

*To all whom it may concern:*

Be it known that we, ARTHUR BUTTERWORTH, ARTHUR BUTTERWORTH, Junior, and HAROLD BUTTERWORTH, subjects of the King of Great Britain, residing at Rochdale, in the county of Lancaster and Kingdom of England, have invented certain new and useful Improvements in Semiautomatic Chucking or Turning Machines and the like Machine Tools, of which the following is a specification.

The present invention relates to improvements in machine tools of the type such as automatic chucking and the like turning lathes or tools.

The object of the present invention is to enable the speed of the feed of the cutting tools or again the speed of revolutions of the spindle to be automatically varied during operations on an article according to the particular tool on the turret which is in operation.

A counter shaft in driving connection with the turret or again to the headstock spindle has a plate with a number of cams arranged at varying effective radius to displace a clutch pin into engagement with one or other of a number of toothed driving wheels arranged adjacent to one another on a driving spindle for the headstock or for the turret.

The invention is more particularly described with reference to the accompanying drawings, in which:—

Fig. 1 shows the arrangement applied to the drive for the lathe headstock spindle.

Fig. 2 shows a modification of the arrangement applied to the drive for the feed of the tools on the turret, and Fig. 3 is a corresponding plan view of Fig. 2.

A drive from a driving shaft 1 is transmitted to the lathe headstock by means of gear wheels permanently in mesh with the gear wheels 2, 3, 4—which wheels can be coupled to shaft 1 at will by the displacement of an operating shaft 5. When the operating shaft 5 is in the position shown, the drive is taken through to the tooth pinion 2 giving a certain speed of revolution to the headstock spindle and chuck, when the spindle 5 is however displaced toward the right the pin 6 forces apart the ends 7 of pairs of pivoted cam jaws 8 which expand a clutch between the driving shaft 1 and the toothed wheel 4 to give one speed of drive. Similarly when the spindle 5 is displaced from the position shown toward the left, the jaws 9 are forced apart by the pin 6 to expand the clutch between the pinion 3 and the shaft 1. When either of the clutches 33 or 34 are in operation the wheel 2 will overrun the shaft 1 due to the roller clutch connection of those parts and due to the fact that the wheel 2 is larger than the wheels 3, 4 and so travels at a lesser speed.

This displacement of the spindle 5 is effected by a link connection 10 having a pin 11 lying in the path of cam stops 12, 13, 14 preferably adjustably mounted on a plate 15 on a driving shaft 16. These cam stops 12, 13, 14 have their surfaces at various radial distances from the center of the shaft 16 so that as this shaft 16 revolves at a predetermined speed so will at certain times the link gear 10 be displaced to shift the operating spindle 5 to clutch a suitable pinion 2, 3 or 4 to the shaft 1.

A similar arrangement shown in Figs. 2 and 3 can be applied to the feed for the tools operated for instance from a gear box 17 in which 18 is the spindle operating the drive for the feed of the tools and has a series of gear wheels 19 keyed upon it which are in constant mesh with a series of gear wheels 20 according to the number of speeds required rotating freely about a shaft 21 but adapted to be clutched to this driving shaft by means of a sliding key 22 one at a time according to the particular rate of feed desired.

The key 22 is mounted on an axially displaceable spindle 23 connected to a lever 24 pivotally mounted on a shaft 25, the lever 24 being keyed to a tooth pin 26 engaging with a rack arm 27 turning about a pivot 28 and having a roller 29 at its outer end adapted to come into range with a number of cam stops 30 preferably adjustably mounted on a disk 31 driven by a worm and worm gear 32. These cam stops 30 are similar to the steps 12, 13, 14 shown in Figure 1 that is to say that they have surfaces operating at various distances from the center of the disc 31 so that in its rotation the pin 29 will be displaced from time to time to alter the rate of feed of the tool according to the particular tool on the turret.

We declare that what we claim is:—

A face plate having a series of perforations each at a constant radial distance from the center of the plate, a selective series of cam stops of varying operative depths, means to mount said cam stops in the perforations equidistant from the center to obtain equality of balance, a selective gear mechanism and means to operate the selection of a gear by the varying radial distance of the surface on the symmetrically disposed stops.

In witness whereof, we have hereunto signed our names this 15th day of September 1919, in the presence of two subscribing witnesses.

ARTHUR BUTTERWORTH.
ARTHUR BUTTERWORTH, JUNR.
HAROLD BUTTERWORTH.

Witnesses:
JOHN PRIOR,
ANNIE THOMAS.